July 31, 1956     I. D. SMITH     2,756,949

FULL SWIVEL STEERING SYSTEM

Filed May 12, 1955     3 Sheets-Sheet 1

INVENTOR.
IRA D. SMITH
BY
ATTORNEY

INVENTOR.
IRA D. SMITH
BY
John E. Reuper
ATTORNEY

July 31, 1956 — I. D. SMITH — 2,756,949
FULL SWIVEL STEERING SYSTEM
Filed May 12, 1955 — 3 Sheets-Sheet 3

INVENTOR.
IRA D. SMITH
BY
ATTORNEY

United States Patent Office 2,756,949
Patented July 31, 1956

2,756,949

FULL SWIVEL STEERING SYSTEM

Ira D. Smith, Bedford, Ohio, assignor to The Cleveland Pneumatic Tool Company, Cleveland, Ohio, a corporation of Ohio Application May 12, 1955, Serial No. 507,797

6 Claims. (Cl. 244—50)

This invention relates generally to a system for steering aircraft on the ground and more particularly to a new and improved steering system for use in ground steering of aircraft which permits full swiveling of the wheels.

It is an important object of this invention to provide a new and improved full swivel steering mechanism for use on aircraft to facilitate the ground handling thereof.

It is another important object of this invention to provide a power steering mechanism which is automatically disconnected when the wheels are turned to a steering angle beyond the normal range of operation.

It is still another object of this invention to provide an aircraft power steering mechanism for steering the wheels through a normal steering range wherein turning of the wheels beyond this range automatically disconnects the power steering mechanism and wherein the power steering mechanism is automatically reconnected when the wheels are returned to the normal range of steering.

It is still a further object of this invention to provide a full swivel steering which includes a power steering mechanism which is automatically oriented for reconnection after it is disconnected to permit full swiveling.

Further objects and advantages will appear from the following description and drawings, wherein.

Figure 1:
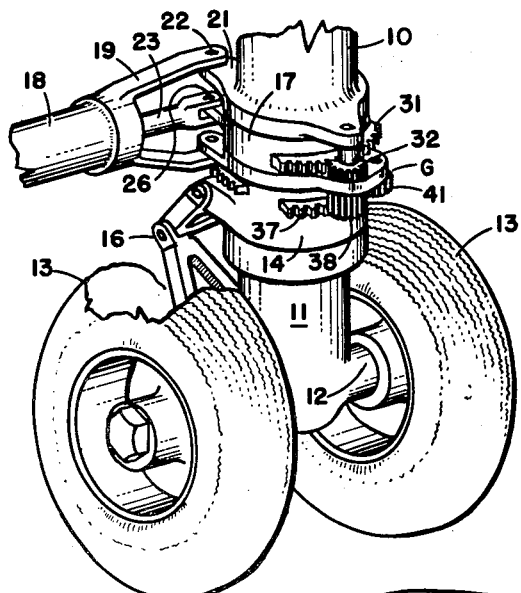
Figure 1 is a perspective view of a steering mechanism according to this invention shown as it would be applied to the nose strut of an aircraft landing gear.

For a clear understanding of this invention, reference should be made to the drawings wherein Figure 1 discloses a conventional nose strut of an aircraft landing gear incorporating a steering mechanism according to this invention. The nose strut includes an upper telescoping member 10 and a lower telescoping member 11 wherein the upper telescoping member is adapted to be mounted on the frame of an aircraft and the lower telescoping member 11 is provided with a lateral extending axle 12 on which wheels 13 are journaled. A shock absorber and spring mechanism (not shown) is incorporated into the telescoping members to cushion the impact of landing and also to support the static weight of the ship when it is on the ground. Since this structure is of a conventional design, the structural details have been eliminated for purposes of simplification. It should be understood, however, that the lower telescoping member 11 is axially movable and rotatable relative to the upper telescoping member 10. A lower steering collar 14 mounted on the upper telescoping member 10 is axially fixed and rotatable relative thereto. Torque arms 16 are connected at their upper end to the lower steering collar 14 and at their lower end to the lower telescoping member 11. The torque arms 16 serve the function of maintaining the rotational orientation between the lower telescoping member 11 and the lower steering collar 14 while permitting axial motion therebetween.

An upper steering collar 17 is also mounted on the upper telescoping member 10 in such a manner that it is axially fixed and rotationally movable relative thereto. A hydraulic cylinder 18 formed with axially extending mounting arms 19 is pivotally connected to laterally projecting lugs 21 supported on the upper telescoping member 10 for rotation about a pivot axis 22. A cooperating piston 23 is pivotally connected to a laterally extending boss 24 formed on the upper steering collar 17 for rotation about the pivot axis 26. The cylinder 18 and piston 23 cooperate to provide a fluid motor means which is utilized to supply the power for turning the upper steering collar 17 when power steering is used. The particular power means utilized to turn the upper steering collar 17 is not critical in this invention; however, a detailed description of a preferred power means for steering is disclosed in the copending application of Walter H. Hogan, Serial No. 481,609 filed January 13, 1955 and reference may be made to that application for the structural details.

The upper and lower steering collars 17 and 14 are connected by a gearing mechanism shown in Figure 1 generally at G which is utilized to connect the two steering collars through the normal range of steering and which automatically disconnects the lower steering collar 14 from the upper steering collar 17 when the wheels 13 are turned beyond the normal range of steering. The gearing mechanism also provides for automatically reconnecting the two steering collars when the wheels are returned to a position within the normal range of steering. For a clear understanding of this portion of the structure, reference should be made to Figures 2 through 6.

The upper steering collar 17 is formed with a first gear sector 31 which intermeshes with a first spur gear 32. The first spur gear 32 is mounted on a shaft 33 which is pivoted for rotation about its axis on laterally extending bosses 34 and 36 supported on the upper telescoping member 10. The lower steering collar 14 is formed with a second gear sector 37 which meshes with a second spur gear 38 fixed to the shaft 33 for rotation with the first spur gear 32. It is apparent, therefore, that when both of the gear sectors 31 and 37 are intermeshed with their respective spur gears 32 and 38, rotation of the upper steering collar 17 will rotate both spur gears 32 and 38 and cause rotation of the lower steering collar 14 through the same angular distance. This is the condition which is present when the steering mechanism is operated through the normal range of steering. In the structure disclosed the normal range of steering would be through an angle of 45 degrees in either direction from the neutral position or a total steering range of 90 degrees. In many cases, however, in the ground handling of the aircraft, it is desirable to provide for full swiveling of the wheels 13 wherein external means would be utilized to control the turning of the wheels. This is particularly important when the aircraft is taken into a hangar or is handled in other confined conditions. If the wheels 13 and in turn the lower telescoping member 11 is turned through an angle beyond the normal steering angle, the spur gear 38 rolls out of engagement with the gear sector 37 at which time rotation of the lower steering collar 14 does not cause any further rotation of the spur gear 38 and the two steering collars are disconnected. The spur gear 32, however, should never disengage the gear sector 31 so the gear sector 31 should be made with the larger peripheral extent than the gear sector 37. If this condition is met, the gear sector 37 is disengaged from the spur gear 38 while the gear sector 31 is still engaged by the spur gear 32.

If the wheels 13 and the lower telescoping member 11 are swiveled through a full 360 degrees, it is necessary to provide means to rotate the upper steering collar 17 from one extreme of the normal steering range to the other so that the two steering collars will be properly oriented when the gear sector 37 reengages the spur gear 38. This re-orientation is not necessary when the lower steering collar 14 is moved out of engagement in one direction and moved back into the normal steering range in the opposite direction. However, in the ground handling of the aircraft in many cases the wheels 13 and the lower telescoping member 11 will be rotated through a 360 degree angle. Therefore, a steering mechanism according to this invention provides means for automatically orientating the two steering collars regardless of the amount of free swiveling.

Figure 7:
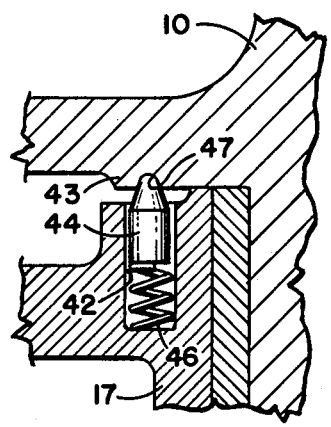
Figure 2:
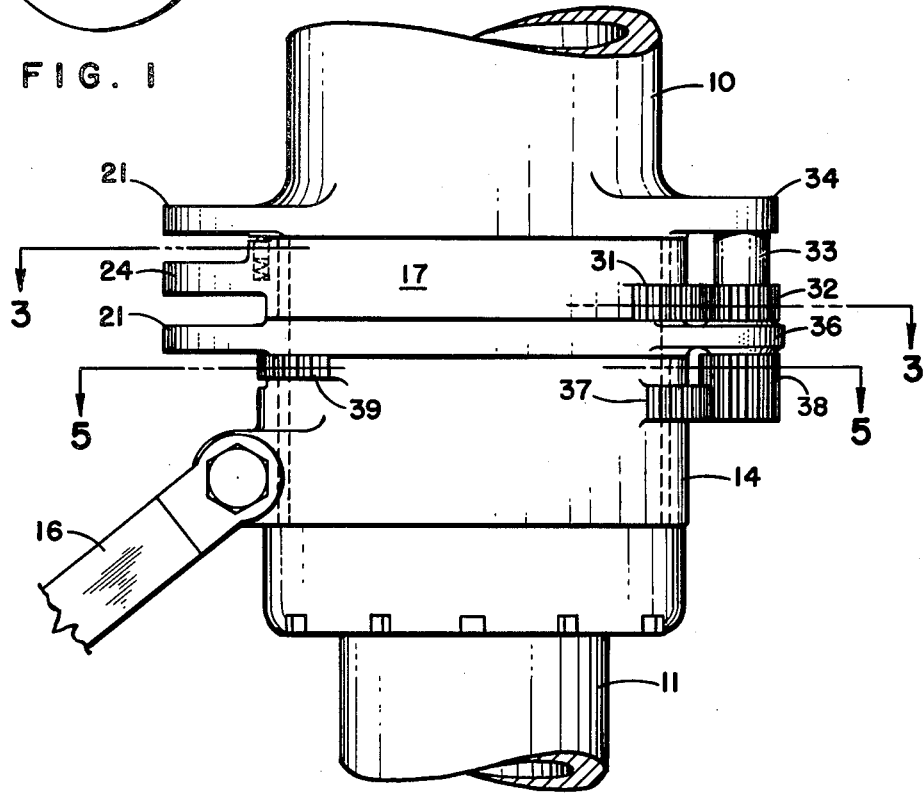
Figure 2 is a fragmentary side elevation with parts removed of the preferred steering structure showing the relative position of the elements when the steering mechanism is in the forward or neutral position wherein the wheels are aligned within the axis of the aircraft.
Figure 3:
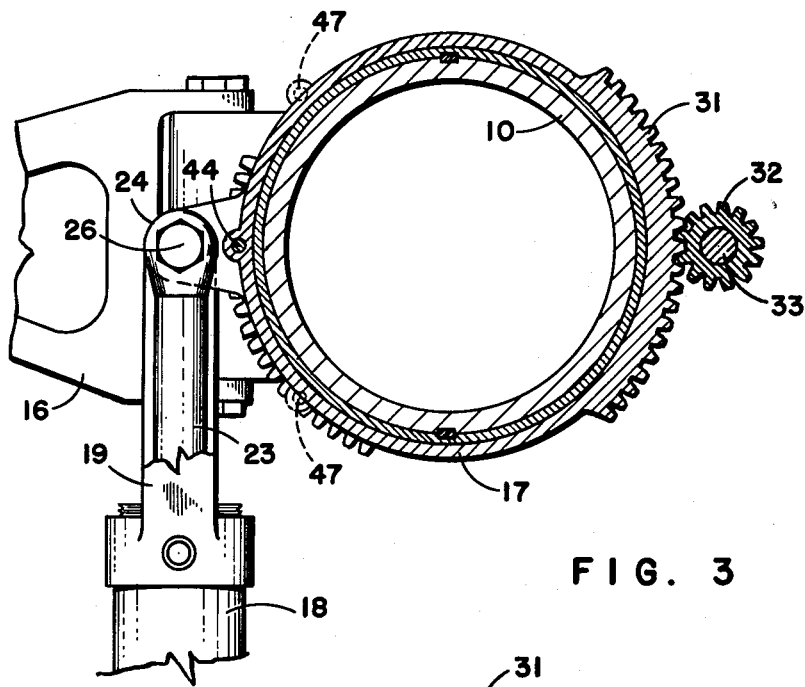
Figure 3 is a cross section taken along 3—3 of Figure 2.
Figure 4:
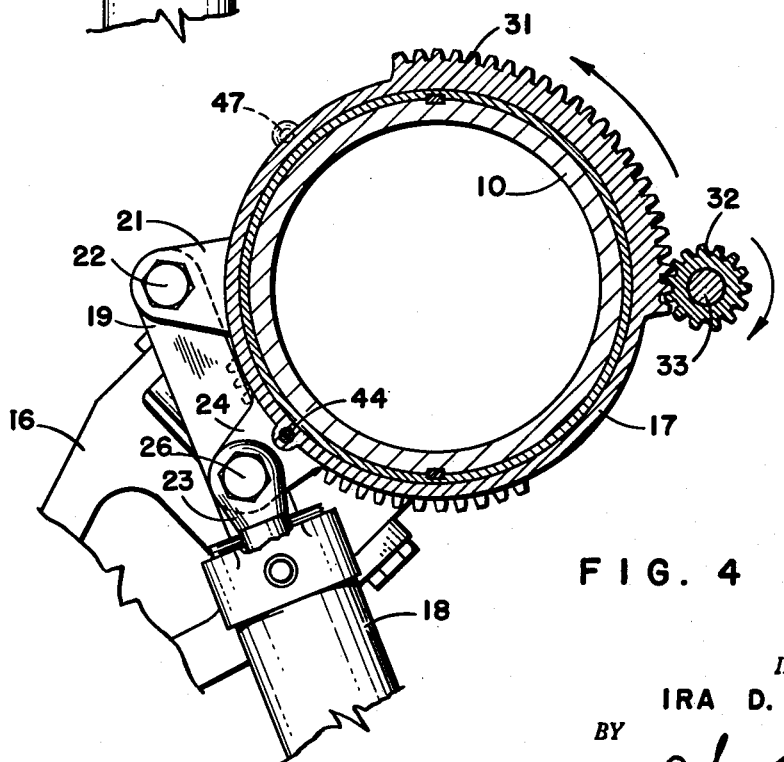
Figure 4 is a cross section similar to Figure 3 showing the position of the elements in one extreme position of the power steering.
Figure 5:
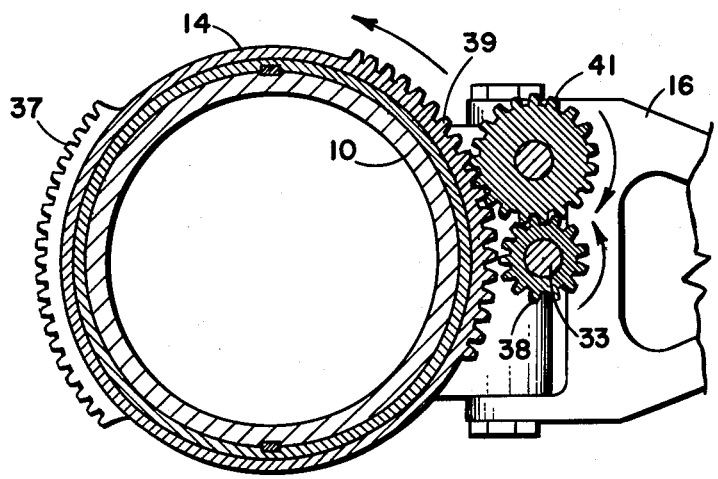
Figure 5 is a cross section taken along 5—5 of Figure 2 with the steering rotated through 180 degrees to show the operation of the re-orienting mechanism.
Figure 6:
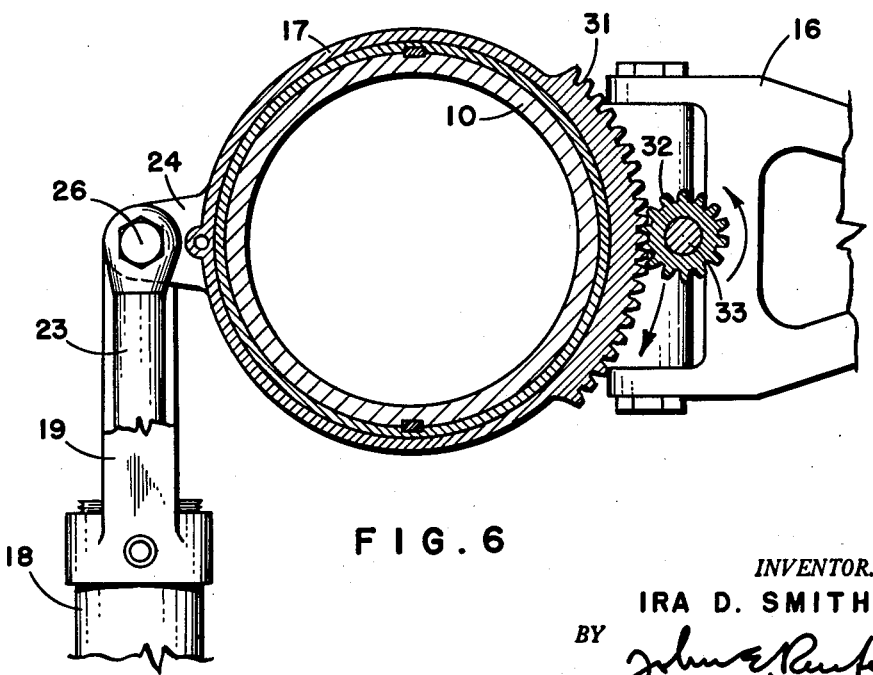
Figure 6 is a cross section similar to Figure 3 showing the position of the elements when the wheels are turned through an angle of 180 degrees from the position shown in Figure 3; and, Figure 7 is an enlarged fragmentary longitudinal section taken through the locking mechanism utilized to prevent free motion of the power unit when it is disconnected from the wheels.

To provide the re-orientation of the two steering collars, the lower steering collar 14 is provided with a third gear sector 39 having a radius less than the radius of the gear sector 37 so that it will clear the spur gear 38. The gear sector 39 is arranged to engage an idler gear 41 shown in Figures 1 and 5 which is axially displaced above the gear sector 37 for clearance. The idler gear 41 is mounted on the mounting boss 36 for rotation about an axis parallel to and spaced from the axis of the shaft 33 and is proportioned to be in permanent engagement with the spur gear 38. When the lower steering collar 14 is rotated through a sufficient angle, the gear sector 39 engages the idler gear 41 as shown in Figure 5. Further rotation of the lower steering collar 14 after the idler gear 41 meshes the gear sector 39 causing the idler gear 41 to rotate and in turn rotate the spur gear 38. As shown by the arrows in Figure 5, the rotation of the idler gear 41 will be in a direction opposite to the direction of rotation of the spur gear 38 under these conditions. Rotation of the spur gear 38 in turn rotates the spur gear 32 thereby turning the upper steering collar 17 in the opposite direction to the direction of rotation of the lower steering collar 14. This is clearly illustrated by the arrows in Figures 5 and 6. The peripheral length of the gear sector 39 is arranged so that when the gear sector 39 is rotated from one end to the other past the idler gear 41, the upper steering collar 17 will be moved through a 90 degree angle. This moves the upper steering collar 17 from one extreme position to the other extreme position. In order to prevent the upper steering collar 17 from rotating due to vibrations, shocks or the like while it is disconnected from the steering collar 14, a detent mechanism is provided which is shown in Figure 7. The upper steering collar 17 is formed with an axially extending bore 42 which is positioned beneath an overhanging shoulder 43 formed on the upper telescoping member 10. A plunger 44 is positioned in the bore 42 and is resiliently urged toward the shoulder 43 by a spring 46. The shoulder 43 is formed with two spaced recesses 47 shown in phantom Figure 3 positioned so that the nose of the plunger 44 will fit into one or the other of the recesses when the upper steering collar 17 is in one or the other of the extreme positions of normal steering. When the plunger is positioned in one of the recesses 47, the upper steering collar 17 is restrained against rotation with sufficient force to prevent rotation of the upper steering collar due to shaking or vibration. However, the power steering mechanism is capable of producing sufficient force to cam the plunger 44 out of the recesses 47 and likewise the plunger will be cammed out of the recesses when the upper steering collar 17 is turned by the spur gear 32.

In operation the two steering collars 14 and 17 rotate together through the connection of the spur gears 32 and 38 when the cylinder 18 and piston 23 provide the steering power. The steering, under the influence of the cylinder and piston is always within the range of normal steering wherein the spur gear 38 is intermeshed with the gear sector 37. When external means are utilized to swivel the wheels 13, the lower telescoping member 11 and the lower steering collar 14 beyond the range of normal steering, the gear sector 37 turns out of engagement with the spur gear 38. If the wheels 13 and lower telescoping member 11 are swiveled through a sufficient angle such as when the wheels are swiveled through 360 degrees, the gear sector 39 engages the idler gear 41 and rotates the upper steering collar 17 through the spur gears 32 and 38 from the extreme position of turning and disengagement to the opposite extreme position of turning so that when the gear sector 37 re-engages the spur gear 38, the two steering collars 14 and 17 will be properly oriented. This operation takes place regardless of the amount of swiveling or the direction of swiveling so that the second steering collar 17 is always in the proper position for re-engagement when the lower steering collar 14 moves back within the range of steering.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. A full swivel steering mechanism comprising a fixed member, first and second coaxial steering collars independently rotatable around their axis relative to said fixed member in both directions from a first position of angular alignment relative to said member, fluid motor means operably connected between said member and first collar for producing relative rotation therebetween in either direction from said first position through a predetermined angle, connecting means between said collars normally maintaining them in a rotationally aligned relationship during the rotation thereof and automatically releasable when said second collar is spaced from said first position by an angle greater than said predetermined angle, and orientating means for said collars automatically effecting said aligned relationship upon re-engagement of said connecting means.

2. A full swivel steering system comprising a fixed member, first and second coaxial collars mounted on said member for independent rotation relative thereto in either direction from a first position of angular alignment, power means operably connected between said member and first collar for turning the latter in either direction from said first position through a predetermined angle, gear means mounted on said member engaging gear teeth formed on each of said collars when said collars are rotationally spaced from said first position by an angle less than said predetermined angle thereby maintaining said collars in rotational orientation during normal rotation thereof, said gear means disengaging the gear teeth on said second collar when said second collar rotates to a position spaced from said first position by an angle greater than said predetermined angle, and means reorienting said collars when said gear means engage the gear teeth of said second collar.

3. A full swivel steering system comprising a fixed member, first and second coaxial collars mounted on said member for independent rotation relative thereto in either direction from a first position of angular alignment, power means operably connected between said member and first collar for turning the latter in either direction from said first position through a predetermined angle, first gear means mounted on said member intermeshing gear teeth formed on said first collar, said second collar being formed with a gear sector intermeshing said first gear means and maintaining rotational alignment between said collars only when said second collar is rotationally spaced from said first position by an angle less than said predetermined angle, and second gear means between said second collar and first gear means automatically effecting said rotational alignment between said collars when said gear sector intermeshes said first gear means.

4. A full swivel steering system comprising a fixed member, first and second coaxial similar collars mounted on said member for independent rotation relative thereto in either direction from a first position of angular alignment, power means operably connected between said member and first collar for turning the latter in either direction from said first position through a predetermined angle, gear means mounted on said member intermeshing gear teeth formed on said first collar, a first gear sector on said second collar intermeshing said gear means only when said second collar is rotationally spaced from said first position by an angle less than said predetermined angle, a second gear sector on said second collar, and an idler gear engaging said first gear means proportioned to intermesh said second sector when said second collar turns to a position rotationally spaced from said first position by an angle greater than said predetermined angle thereby rotating said first collar in a direction opposite to the direction of rotation of said second collar.

5. A full swivel aircraft steering system comprising first and second telescoping members capable of relative axial and rotational motion, first and second steering collars mounted on said first member for independent rotation relative thereto in either direction from a first position of angular alignment, power means operably connected between said first collar and first member for producing relative rotation therebetween in either direction from said first position of angular alignment through a predetermined angle, torque means operably connected between said second collar and second member preventing relative rotation therebetween, rotation transmitting means connecting said collars maintaining a rotationally aligned relationship therebetween only when said second collar is rotationally spaced from said first position by an angle less than said predetermined angle, said rotation transmitting means automatically disconnecting said collars when said second collar rotates to a position spaced from said first position by an angle greater than said predetermined angle and automatically reconnecting said collars when said second collar moves back to a position spaced from said first position by an angle less than said predetermined angle.

6. A full swivel aircraft steering system comprising first and second telescoping members capable of relative axial and rotational motion, said first member being adapted to be connected to an aircraft and a ground engaging element carried by said second member, first and second steering collars mounted on said first member for independent rotation relative thereto in either direction from a first position of angular alignment, power means operably connected between said first collar and first member for producing relative rotation therebetween in either direction from said first position of angular alignment through a predetermined angle, torque means operably connected between said second collar and second member preventing relative rotation therebetween, first gear means connecting said collars maintaining relative rotation orientation therebetween only when said second collar is rotationally spaced from said first position by an angle less than said predetermined angle, said first gear means automatically disconnecting said collars when said second collar rotates to a position spaced from said first position by an angle greater than said predetermined angle and automatically reconnecting said collars when said second collar moves back to a position spaced from said first position by an angle less than said predetermined angle, and second gear means automatically effecting said orientation of said collars when said first gear means reconnects said collars.

References Cited in the file of this patent

UNITED STATES PATENTS 2,508,057   Bishop _____ May 16, 1950